US008155632B2

United States Patent
Lewis et al.

(10) Patent No.: US 8,155,632 B2
(45) Date of Patent: Apr. 10, 2012

(54) SYSTEMS AND METHODS FOR VOTING IN A TELECONFERENCE USING A MOBILE DEVICE

(75) Inventors: John Lewis, Lawrenceville, GA (US); Justin McNamara, Atlanta, GA (US); Fulvio Arturo Cenciarelli, Suwanee, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 309 days.

(21) Appl. No.: 12/486,288

(22) Filed: Jun. 17, 2009

(65) Prior Publication Data

US 2010/0323677 A1    Dec. 23, 2010

(51) Int. Cl.
*H04W 4/00* (2009.01)
(52) U.S. Cl. .............. 455/416; 455/414.1; 455/415
(58) Field of Classification Search ............ 455/416, 455/518–520, 414.1, 3.06, 403, 2.01, 461, 455/466
See application file for complete search history.

(56) References Cited

U.S. PATENT DOCUMENTS

| 5,020,098 | A | 5/1991 | Celli | |
|---|---|---|---|---|
| 6,768,895 | B2* | 7/2004 | Lahtinen | ............ 455/2.01 |
| 7,139,379 | B2 | 11/2006 | Kobrosly et al. | |
| 2003/0053423 | A1 | 3/2003 | Mateu | |
| 2003/0231746 | A1 | 12/2003 | Hunter et al. | |
| 2004/0125933 | A1* | 7/2004 | Jun et al. | ............ 379/202.01 |
| 2004/0258222 | A1 | 12/2004 | Kobrosly et al. | |
| 2006/0026002 | A1 | 2/2006 | Potekhin et al. | |
| 2006/0245566 | A1 | 11/2006 | Parker | |
| 2007/0058796 | A1* | 3/2007 | Schmidt et al. | ........ 379/202.01 |
| 2007/0064898 | A1 | 3/2007 | Amano et al. | |
| 2007/0111716 | A1* | 5/2007 | Leigh et al. | ............ 455/417 |
| 2008/0105742 | A1* | 5/2008 | Kim et al. | ............ 235/386 |

OTHER PUBLICATIONS

'Using the Polling Feature', Webex, Event Center, Article, http://wlc/webex.com/docs/job_aids/EC6_Polling_JA_EN.pdf, Updated Aug. 15, 2007, 2 pages.

* cited by examiner

*Primary Examiner* — Ajit Patel
*Assistant Examiner* — Erica Navar
(74) *Attorney, Agent, or Firm* — Woodcock Washburn LLP

(57) ABSTRACT

Methods and systems for voting in a teleconference through the use of a telecommunication device are disclosed. The telecommunication device receives a digital vote request signal and transmits a digital vote signal from the user. A teleconference system is disclosed that enables a user to determine which participant is entitled to vote and solicits a vote from those participants through a digital signal communicated to a telecommunication device The teleconference system tallies the and reports the vote to all participants.

27 Claims, 12 Drawing Sheets

SYSTEMS AND METHODS FOR VOTING IN A TELECONFERENCE USING A MOBILE DEVICE

TECHNICAL FIELD

The present invention relates to systems and methods for remote voting. More particularly, the present invention relates to systems and methods for remote voting in a teleconference using telecommunication devices including mobile devices.

BACKGROUND

Teleconferencing, the ability to establish a telephone conference among a number of participants, has been employed as a way of conducting meetings for many years. For example, businesses use teleconferencing to meet with clients, project teams, and to deliver presentations between participants in different locations. The advantages of teleconferencing are reduction in travel costs, and increasing productivity of workers by eliminating the time to travel to a meeting.

In a teleconference, participants are connected through a conference bridge. A conference bridge maybe a server that links a plurality of telephone calls, allowing multiple people to be connected in the same call (conference call). In a typical teleconference, each conference is assigned an identifier (e.g. an ID number). The identifier is given to each participant. A host is assigned for the conference and the participants are connected when the host joins the conference. Parties can join the conference at any time by calling a designated phone number and providing the conference identifier.

Conference call management has progressed to the point where such calls are now efficient and productive. Such calls may be used for everything from technical development to corporate calls with Wall Street and everything in between. Corporate board meeting are often convened via teleconferencing calls. Call services such as Live Meeting® and others permit an administrator to control additional services such as voting, especially helpful in the board meeting context. Such systems typically require an internet connection to fully take advantage of the additional call services.

Existing teleconferencing technology have several drawbacks when used in more formal meetings where, for example, a vote is required to authorize some action, and there are participants joining by telephone or mobile devices. An example of a formal meeting may be a regular board meeting of an organization where resolutions are voted on. A disadvantage of present teleconferencing methods are that typically, when participants access the teleconference by telephone, voting usually requires a voice vote. When a voice vote is taken, there is no efficient way of establishing who is voting, and how they are voting without taking a roll call of the participants. Additionally, in some meetings a quorum of participants may be needed for the vote to be effective, and again a roll call of who is on the conference call at the time of the vote would be required to establish that there is a quorum for the vote.

With telecommunications becoming increasingly mobile, the additional features of conference call management have not been extended to the mobile telecommunications space. For example, there is no known method for soliciting and controlling voting from participants using mobile devices. In a typical teleconference, voting is conducted by voice vote. For example, the leader of the teleconference, chairman of the meeting will call for a vote on a stated matter. The vote will be communicated by a voice vote of each participant. In a situation where there are participants that are not entitled to vote it is difficult to ascertain whether a participant giving a voice vote is actually entitled to vote. Additionally, unless the vote is unanimous the only way to accurately account for the vote is by performing a roll call vote. This requires the chairman for the secretary to call out the name of each participant, and record their vote. This is inefficient when there are multiple matters to be voted on and a large number of participants. Thus, there is a need to develop a system and method to provide teleconference participants with an easy and secure way to vote. Additionally, because of the increased use of mobile devices for telecommunications, there is a need to develop a system and method to provide teleconference participants using mobile devices with an easy and secure way to vote.

SUMMARY OF THE DISCLOSURE

The present invention solves this problem by providing a method of voting in a teleconference wherein a telecommunication device receives an electronic vote request signal, records the user's vote and sends an electronic vote signal from the mobile device. Additionally the method may provide the capability of identifying the user to ensure that the user is entitled to vote, in identifying the telecommunication device utilized by the user.

A system is also provided that enables a user to vote in a teleconference to the use of the mobile device by providing a user interface in the mobile device that enables the mobile device to display an electronic vote request signal, user interface that provides the user with a vote option, and a mechanism for recording and transmitting the vote.

These and other features and advantages of various exemplary embodiments of systems and methods according to this disclosure are described in, or are apparent from, the following detailed description of various exemplary embodiments of the systems and methods of this subject matter.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF ILLUSTRATIVE EMBODIMENTS

With today's mobile workforce, the use of teleconferencing to conduct formal meetings is much more common. Such formal meetings may include meetings of the Board of Directors of an organization, meetings with working committees of an organization or other groups where consensus is desired. Establishment of consensus usually requires a vote. It is sometimes difficult to appropriately record votes in a teleconference, particularly if some participants in the teleconference are not entitled to vote.

A typical formal meeting is conducted under a set of rules that govern the process of consideration, debate and voting. One such set of rules is Robert's rules of order. Under such rules a motion is made with regard to an action to be taken by the deliberating body of an organization. The motion is then seconded and the matter was put to a vote. At that point the chair of the meeting will state the question that is up for consideration and invite debate. After the matter has been debated the chair will put the question to a vote. Each participant entitled to vote will then record a vote on the question. After the votes are tallied, the results of the vote are announced.

Figure 1:
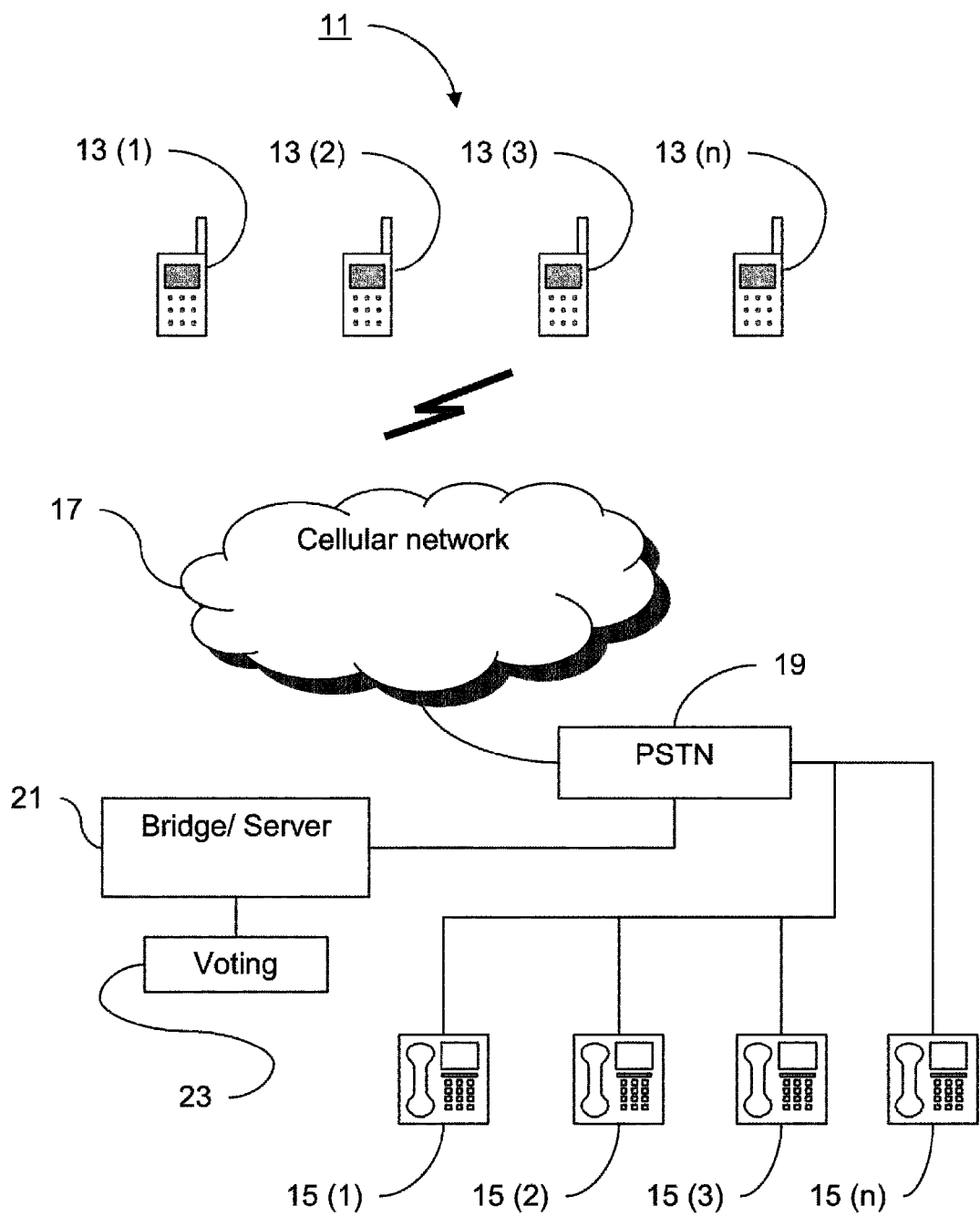
FIG. 1 is a high-level representation of a system for voting in a teleconference using a telecommunication device.

FIG. 1 shows a high-level illustration of a configuration of a teleconferencing system 11 in which the method of the present disclosure can be utilized. The system 11 may include a plurality of mobile devices 13(1), 13(2), 13(3) . . . and 13(*n*), the system 11 may also include a plurality of land lines 15(1), 15(2), 15(3), and 15(*n*), etc. A landline is a fixed telecommunication device such as a telephone. A landline refers to a physical connection between two telecommunications devices. The landline is different from a mobile device, which is connected through a signal relayed through a series of relay towers. The use of mobile devices has overtaken fixed telecommunication devices in many areas. However, fixed communication devices will remain is use for the foreseeable future. Consequently, a method for voting in a teleconference should take into account participants that use mobile devices and fixed telecommunication devices. The mobile devices 13 and land lines 15 are referred to as telecommunication devices below. The mobile devices 13 are connected to a teleconference via a cellular network 17. The fixed telecommunication devices 15 are connected to the teleconference via a public circuit switched telephone network (PSTN 19). The connection of the telecommunication devices is accomplished by a teleconference bridge/server 21. Associated with the bridge/server 21 is a voting application 23 that implements the methods of this disclosure.

The teleconference bridge/server 21 connects multiple incoming calls. In a typical a user enters a number provided by the provider of the teleconference services. When the number is entered by the user, the call is redirected to the teleconference bridge/server 21 which connects the lines. A typical teleconference bridge/server 21 includes a subsystem that mixes the signals received from each of the telecommunication devices. The teleconference bridge/server 21 also includes a subsystem that generates an audio signal and transmits each of the generated signals to the telecommunication devices connected to the teleconference. The teleconference bridge/server 21 is typically a digital processing device such as a server and includes software subsystem that control how signals are mixed and processed. The teleconference bridge/server 21 may include memory subsystems such as Random Access Memory (RAM), Read Only Memory (ROM), or any memory known or hereafter developed for storing programs including computer executable instructions. The teleconference bridge/server 21 may be linked to a private branch exchange (PBX) within an organization. Other technologies for accomplishing teleconferencing are available to users.

Figure 2:
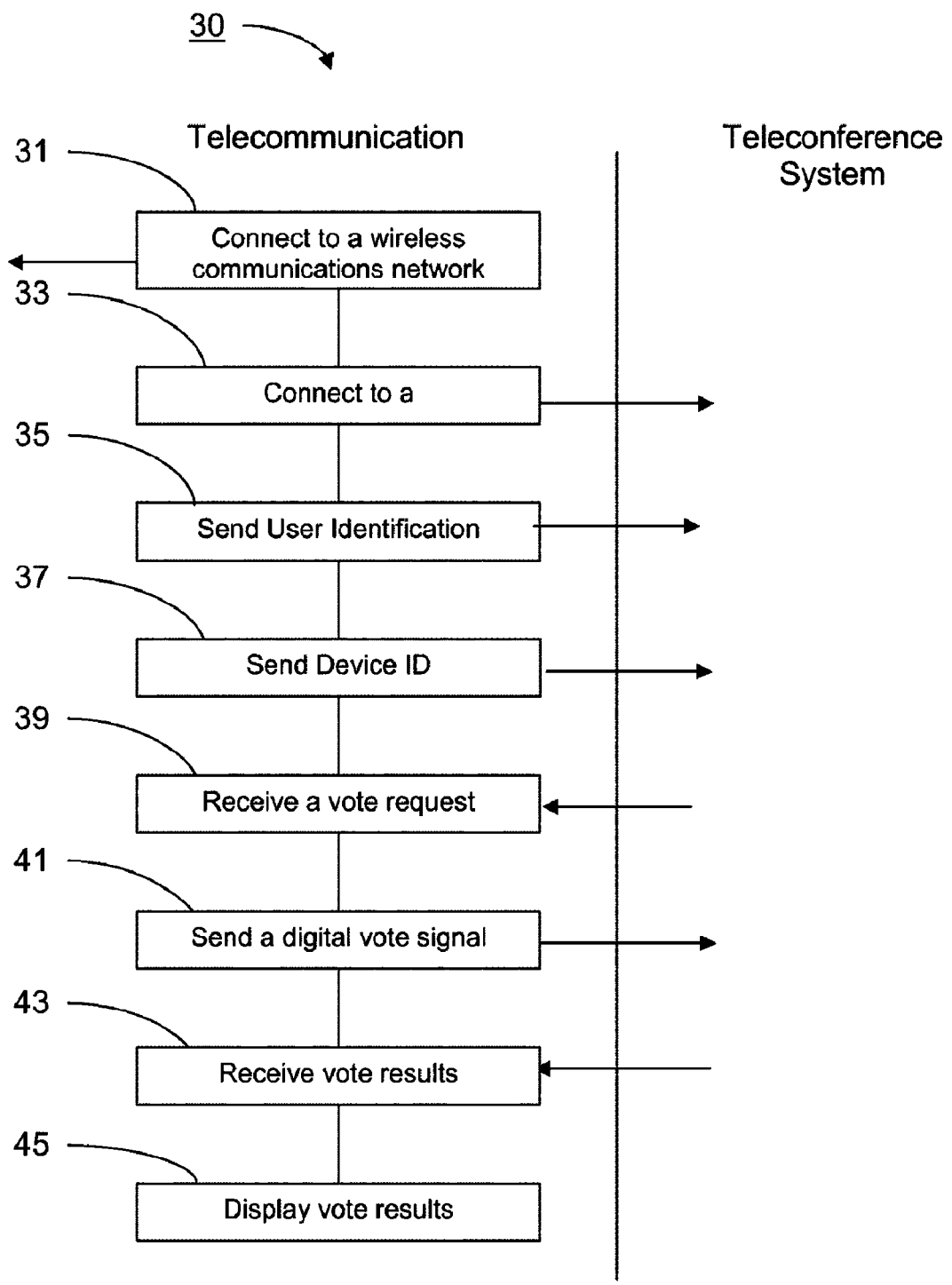
FIG. 2 is a flow chart of a non-limiting, exemplary method of voting using a telecommunication device in accordance with one embodiment as may be implemented in a user's telecommunication device.

Illustrated in FIG. 2 is a method of voting in a teleconference that may be implemented in a telecommunication device such as a mobile device 13 or fixed telecommunication device 15 discussed with reference to FIG. 1. In the embodiment illustrated in FIG. 2 the user of the telecommunication device, for example, a mobile device, connects to a wireless communication network (Block 31). The user of the mobile device then enters the teleconference address. The teleconference address may include a telephone number and a code to identify the conference. The user then connects to the teleconference (Block 33). In one embodiment the user sends a user identification (Block 35). The user identification may be a text message, voice command, or a digital signal that uniquely identifies the user (participant) of the telecommunication device that is participating in the teleconference. The method may include identifying the telecommunication device by sending a device ID (Block 37). In the case of mobile devices there are a number of identifiers that can be used as a device ID. These include the calling party number (CPN) a mobile identification number (MIN) or an electronic serial number (ESN) is a unique 32-bit number programmed into the phone when it is manufactured. Upon being connected to the teleconference, the user may participate in the teleconference as usual.

When a matter is put to a vote the telecommunication device, such as a mobile device 13 will receive a vote request signal (Block 39). The vote request signal may be transmitted as a digital signal such as a Short Message service (SMS), through the cellular network data channels, IP Multimedia Subsystem (IMS) or web based signals. The user records his or her vote and the mobile device sends a digital vote signal to the teleconferencing system (Block 41). The digital vote signal may be a data message, text message, or a tone generated by pressing a key on the telecommunication device. For example, the vote request signal may include instruction to press a number on the mobile device keypad to vote in the affirmative (e.g. #1) and a different number to vote in the negative (e.g. #0). In one embodiment, the electronic vote signal includes an identification of the telecommunication device. In another embodiment the electronic vote signal may be a voice command coupled with an identification of the mobile device. The votes are then tallied by a teleconferencing voting system and the vote results may be sent to the user by the teleconferencing voting system and received in the telecommunication device (Block 43). The vote results may then be displayed in a display unit of the telecommunication device for example in the display screen of a mobile device 13 (Block 45).

Voting may be performed by a mobile device such as described below and illustrated in FIGS. 8 and 9. Alternately the method may be performed by a fixed telecommunication device such as a telephone. In the case of a fixed telecommunication device, the step (block 31) of connecting to a wireless network would not be necessary.

Figure 3:
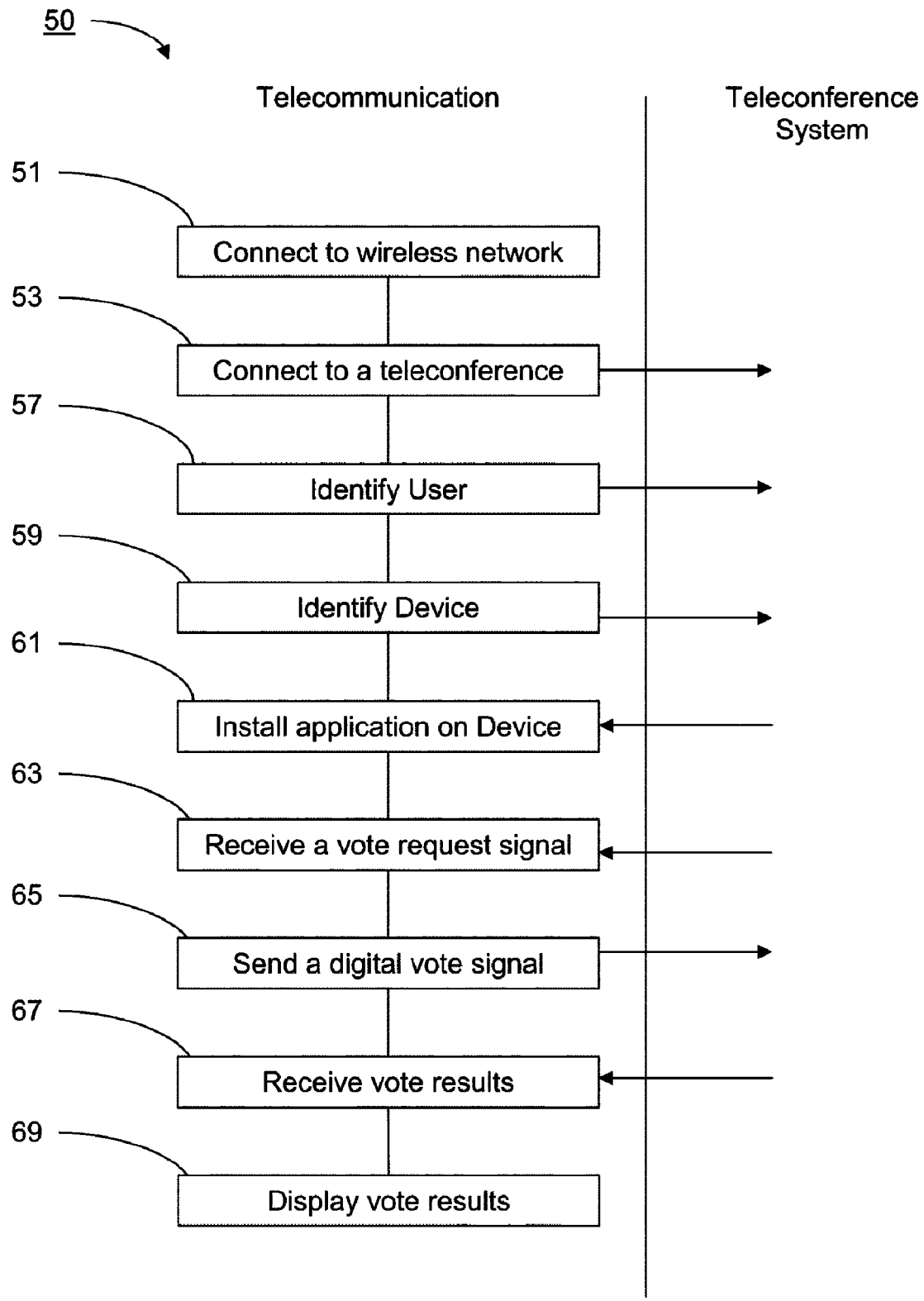
FIG. 3 is a flow chart of a non-limiting, exemplary alternate method of voting using a telecommunication device in accordance with another embodiment as may be implemented in a user's telecommunication device.
Figure 4:
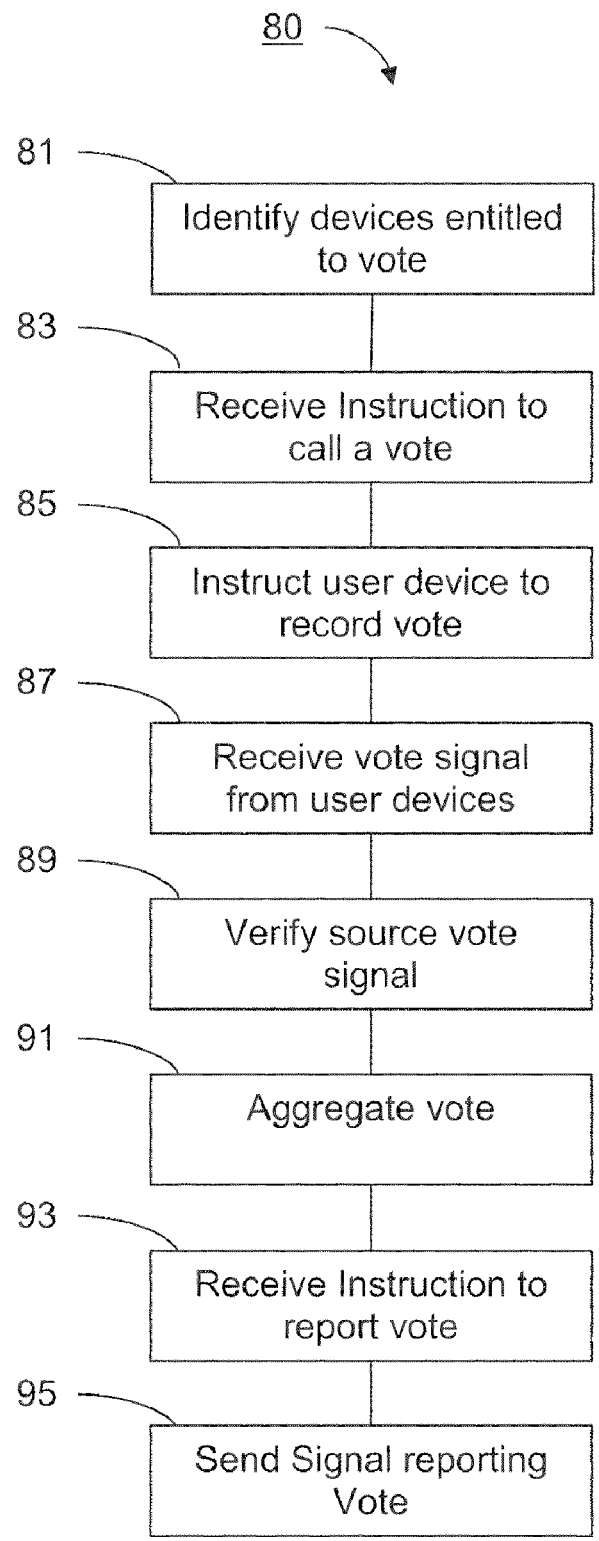
FIG. 4 is a non-limiting, exemplary illustration of a method of voting in accordance with an embodiment that may be implemented in a teleconferencing system.

An alternate method 50 of voting in a teleconference is illustrated in FIG. 3. In this embodiment a voting application may be downloaded to a mobile device to provide an enhanced capability for voting. In the method 50 the user connects to the wireless network (Block 51), and then connects to a teleconference (Block 53). At this point the device may send a signal identifying the user (Block 57), and optionally identifying the mobile device (Block 59). Once connected to the teleconference, an application at the teleconference site may send an executable voting application to the mobile device (Block 61). The voting application may include computer executable instructions to display a vote request on the mobile device display. The display of the vote request may include a display of the matter being voted on, and indicia on how to execute an affirmative or negative vote. In another embodiment, the voting application may include computer executable instructions to mute voice communications from the mobile device while the vote is pending. In yet another embodiment the voting application may include computer executable instructions to display the results of the vote.

When a matter is put to a vote, the mobile device receives a vote request signal (Block 63) that may be processed by the voting application. The participant records the vote and sends a vote signal (block 65) to the teleconference voting system. The mobile device may receive the vote results (Block 67), and the voting application may instruct the mobile device to display the vote results on a display. The receipt and display of the vote results may be communicated close to real-time as other participants record their votes. This allows a participant to ascertain how the vote is shaping up before the participant's vote is cast.

Figure 5:
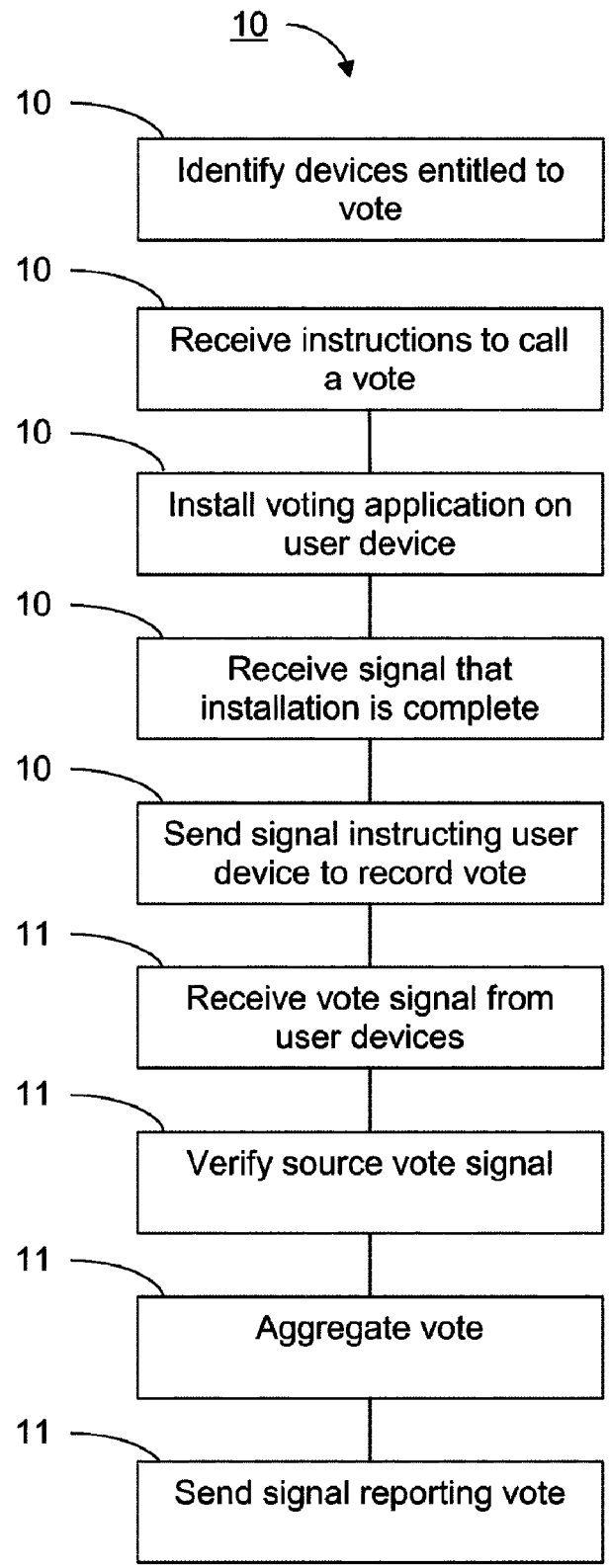
FIG. 5 is a non-limiting, exemplary illustration of an alternate method of voting in accordance with an embodiment that may be implemented in a teleconferencing system.

FIG. 5 illustrates an alternate embodiment of a method for calling and recording votes during a teleconference 100, as may be implemented by a teleconference voting system, such as the bridge/server 21 and the voting application 23 of FIG. 1. The teleconference voting system identifies the users that are entitled to vote (Block 101). The leader of the teleconference (host, or chairman of the meeting) may instruct the teleconference voting system to call for a vote (Block 103). The teleconference system may then poll the telecommunication devices to determine if the mobile device has a voting application. If the telecommunication device requires a voting application, the teleconference system may download a voting application to the mobile device (Block 105). After the installation is complete (Block 107), the teleconference voting system may send a signal instructing the user of the mobile device to record a vote (Block 109). The signal may include data about the matter being voted on and instructions on how to record a vote. Upon receipt of the vote signal from a mobile device (Block 111) the teleconference voting system verifies the source of the vote signal to determine that the user is entitled to vote (Block 113.). The teleconference voting system may then aggregate vote (Block 115), and send a signal reporting the vote to all of the devices connected to the teleconference (Block 117).

Figure 6:
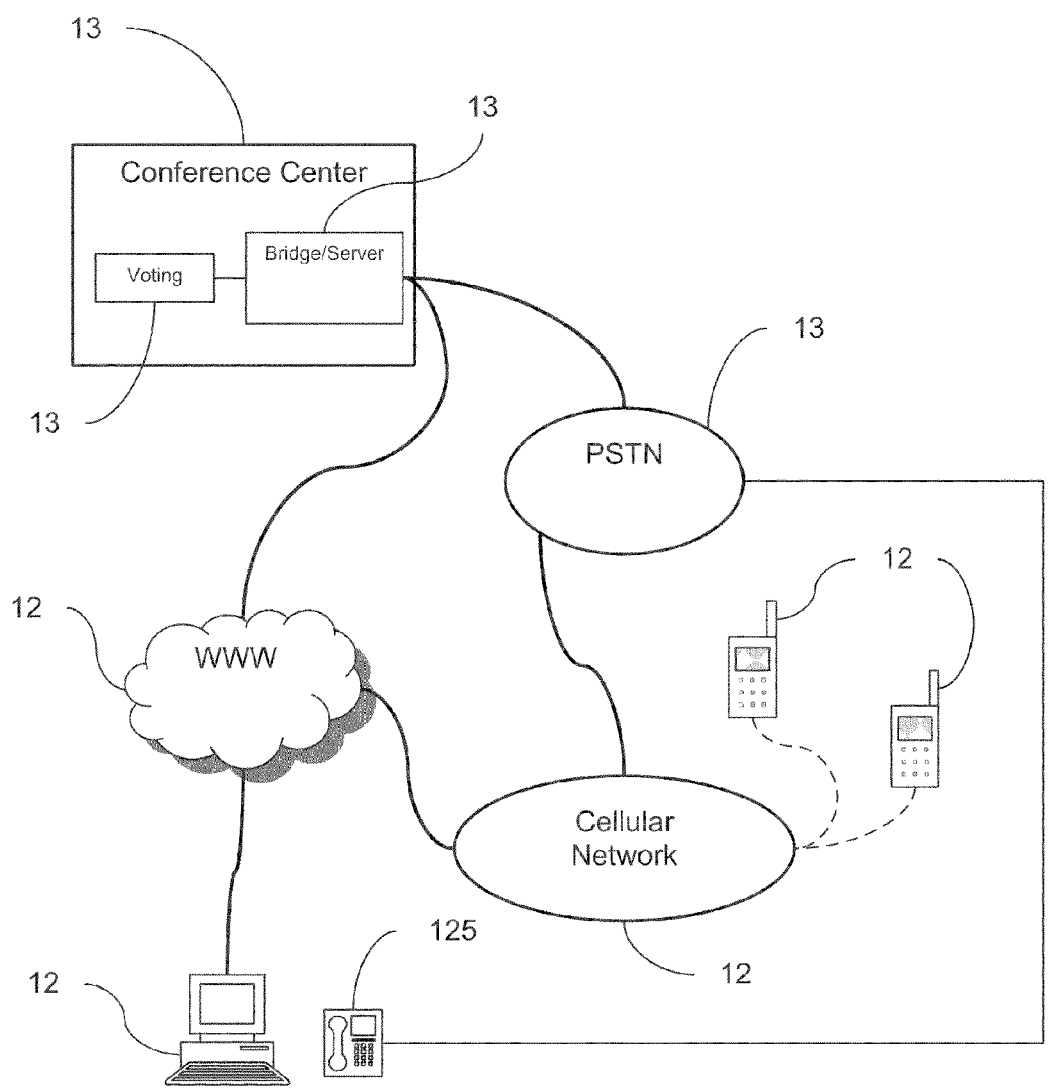
FIG. 6 is a high-level representation of an alternate embodiment of a system for voting in a teleconference.

Illustrated in FIG. 6 is an alternate configuration of a teleconferencing system 120. A plurality of mobile devices 121 are connected through a cellular network 123 to a conference center 133. A plurality of telephones (landlines) 125 may be connected through a PSTN to the conference center 133. Additionally a plurality of computers 127 may be connected to the conference center 133 through the Internet (www) 129. The connection may be carried out through a testing Web conferencing tools that are commercially available. The connections to the teleconference are handled by a bridge/server 135 associated with a voting application 137 which may be a computer program executable by the bridge/server 135. In this particular configuration audiovisual content may be shared with participants utilizing computers 127 or a combination of computers 127 and land lines 125. Audiovisual content may also be shared with the mobile devices 121.

Figure 7:
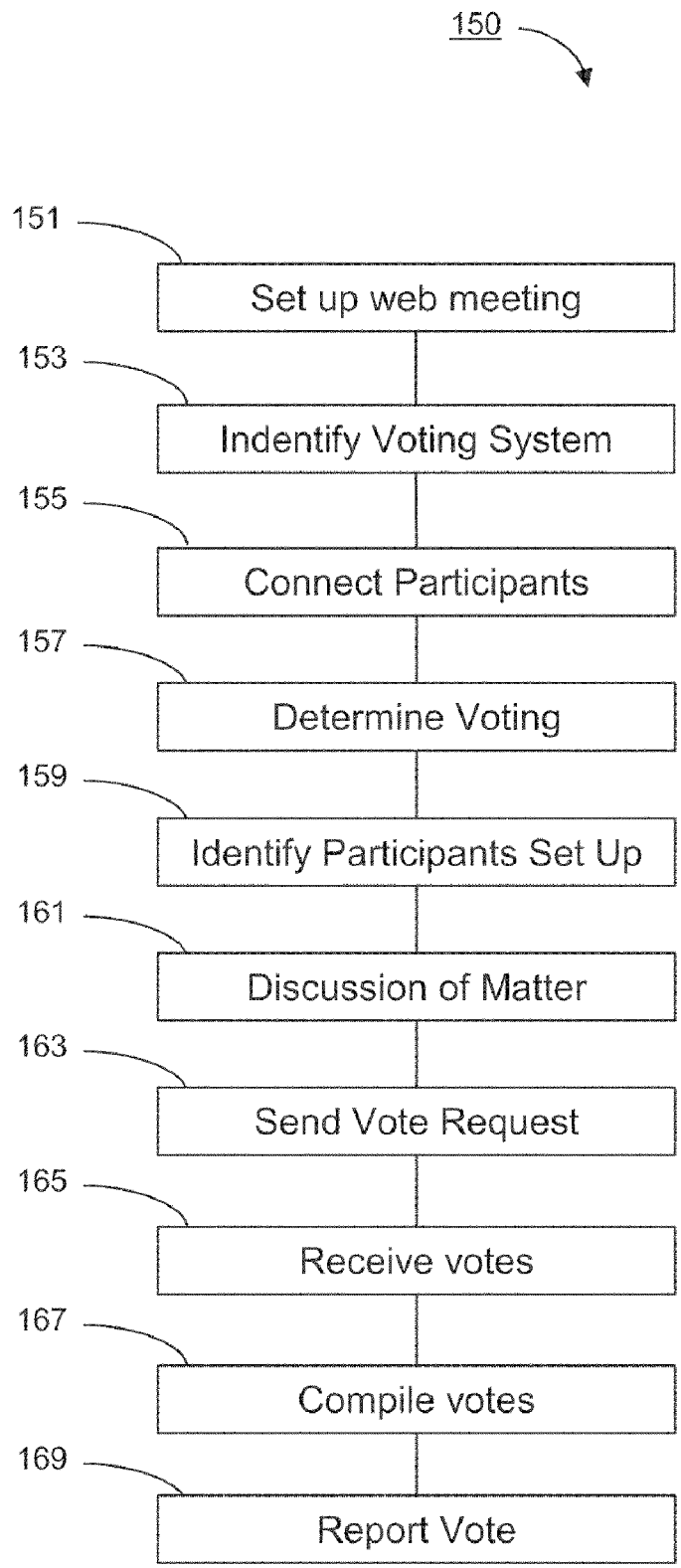
FIG. 7 is a flow chart of a non-limiting, exemplary method of voting using a telecommunication device in accordance with an alternate embodiment as may be implemented in a teleconferencing system.

FIG. 7 illustrates an alternative embodiment of a method of voting until a conference that may be implemented in a bridge/server 135 in FIG. 6. The leader or host of the conference may set up a web meeting (Block 151), with a dial in number and conference ID code. The device that will control the voting system is identified (Block 152). The device that controls the voting system may include a computer, or a mobile device. The device that controls the voting system maybe the leader's computer or mobile device, or the computer or mobile device of a person designated by the leader. As participants dial in to the teleconference the teleconference system will connect the participants to the teleconference (Block 155). In one embodiment of the teleconference system will determine which of the participants are entitled to vote in the meeting (Block 157). This may be accomplished as described above, through the use of a user Id, identification of the device used to connect to the teleconference or a combination of both. If there is a mix of devices such as for example, computers, land lines and mobile devices, the teleconference may identify the particular set up being used by the participants to be able to provide signals compatible with the participant's device (Block 159). The teleconference system may provide the leader or the user controlling the teleconference system with the ability to control various aspects of the discussion of the matter to be voted on (Block 161). For example, the leader may want to provide the floor to one party at a time by muting all participants except the one that has the floor. The leader may want to limit the amount of time that a participant may speak on a particular issue. This functionality may be provided to the leader's device through a user-interface in the leader's device. The floor could be automatically transferred based on "no audio" from one line and audio from another line. The floor could also be controlled through a queue. The queue would be accessed through an interface (dtmf, sip, web . . . ). The queue would beep when you have the floor. The teleconference system may include various detection and measuring mechanisms to provide the leader with the information to control the meeting. For example the teleconference system may provide a "silence detector" so that when a participant joins and then ceases to participate (for example by going to lunch), a signal can be sent to the participants device when the conference ends, instructing the device to disconnect from the call. A detector may be provided to the leader that identifies participants who have not contributed, such as for example by measuring a percentage of the time they spoke. Other functionality may be provided as part of the teleconferencing system such as providing the leader with a display of the physical location of each participant. The participants may be provided with news and local weather of the other participants to increase the personal experience the conference call.

The systems and methods for voting in a teleconference may be implemented in a variety of mobile devices, such as wireless devices used in a variety of networks as described below.

Figure 8:
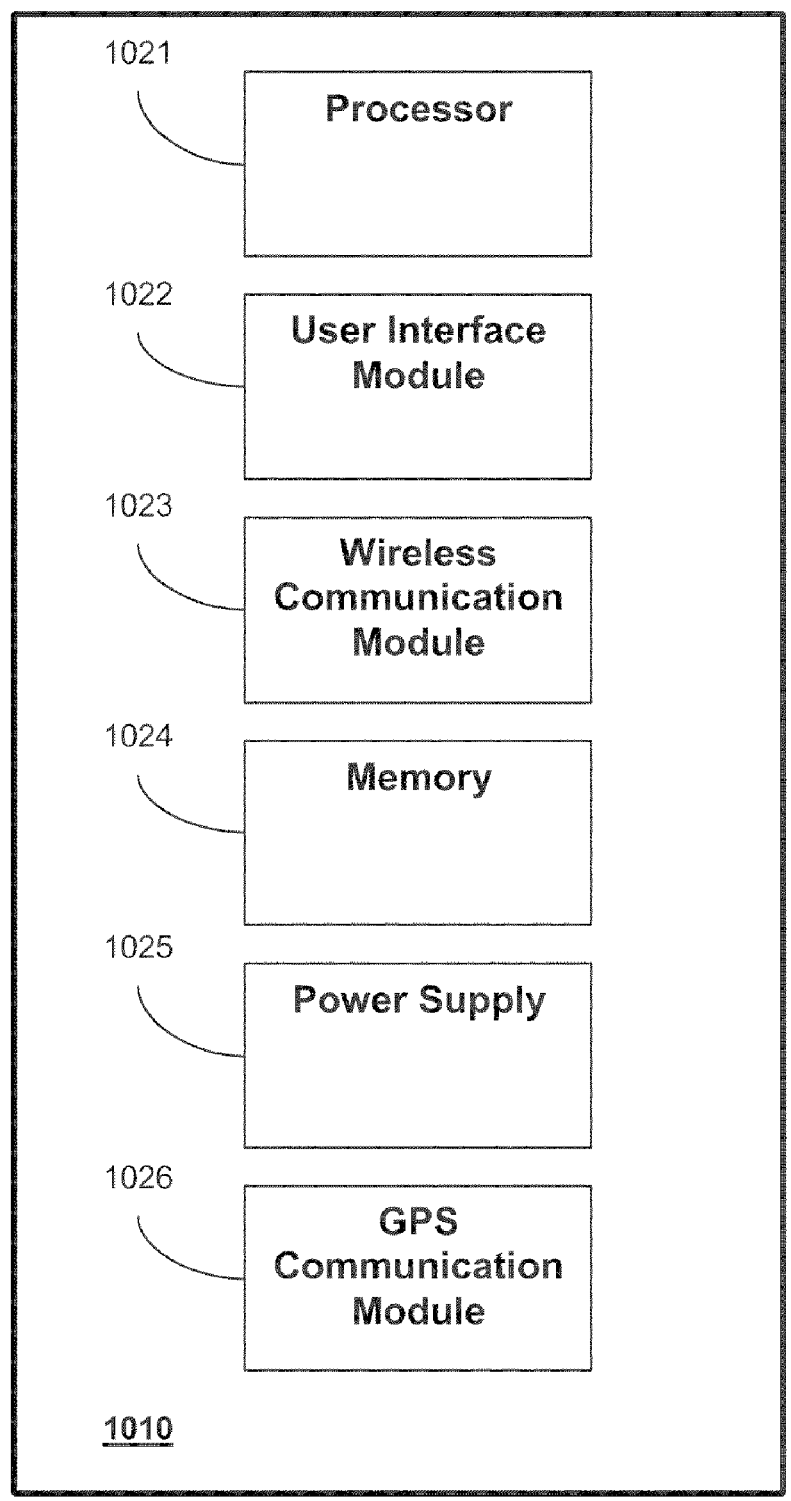
FIG. 8 is a block diagram of a non-limiting, exemplary wireless device that may be used in connection with an embodiment.

FIG. 8 illustrates an example wireless device 1010 that may be used in connection with an embodiment. References will also be made to other figures of the present disclosure as appropriate. For example, device 102 may be a wireless device of the type described in regard to FIG. 8, and may have some, all, or none of the components and modules described in regard to FIG. 8. It will be appreciated that the components and modules of wireless device 1010 illustrated in FIG. 8 are illustrative, and that any number and type of components and/or modules may be present in wireless device 1010. In addition, the functions performed by any or all of the components and modules illustrated in FIG. 8 may be performed by any number of physical components. Thus, it is possible that in some embodiments the functionality of more than one component and/or module illustrated in FIG. 8 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to constructing, transmitting, receiving messages such as SMS and MMS messages, operating an address book, and determining alternate addresses, for example. User interface module 1022 may be any type or combination of hardware and/or software that enables a user to operate and interact with wireless device 1010, in one embodiment, to compose and read messages. For example, user interface module 1022 may include a display, physical and "soft" keys, voice recognition software, microphone, speaker and the like. Wireless communication module 1023 may be any type or combination of hardware and/or software that enables wireless device 1010 to communicate with, for example, network 103 or any other type of wireless communications network. Memory 1024 enables wireless device 1010 to store information, such as an address book, contacts information, or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

GPS communication module 1026 may be any type or combination of hardware and/or software that enables wireless device 1010 to communicate with GPS location equipment. In one embodiment, wireless communication module 1023 may perform the functions of GPS communication module 1026. In an alternative embodiment, GPS communication module 1026 may be separate from wireless communication module 1023.

Figure 9:
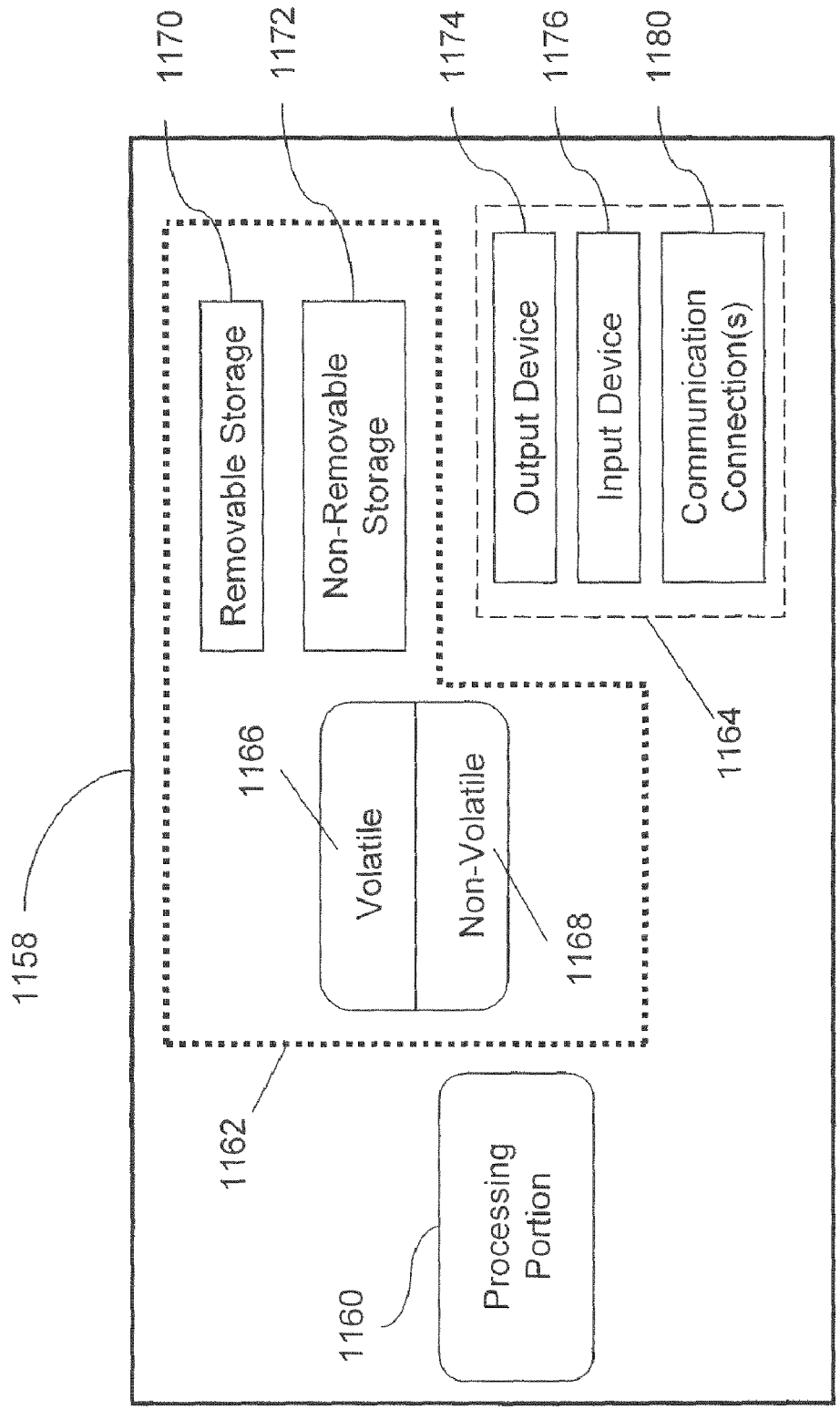
FIG. 9 is a block diagram of a non-limiting, exemplary processor in which the present subject matter may be implemented.
Figure 10:
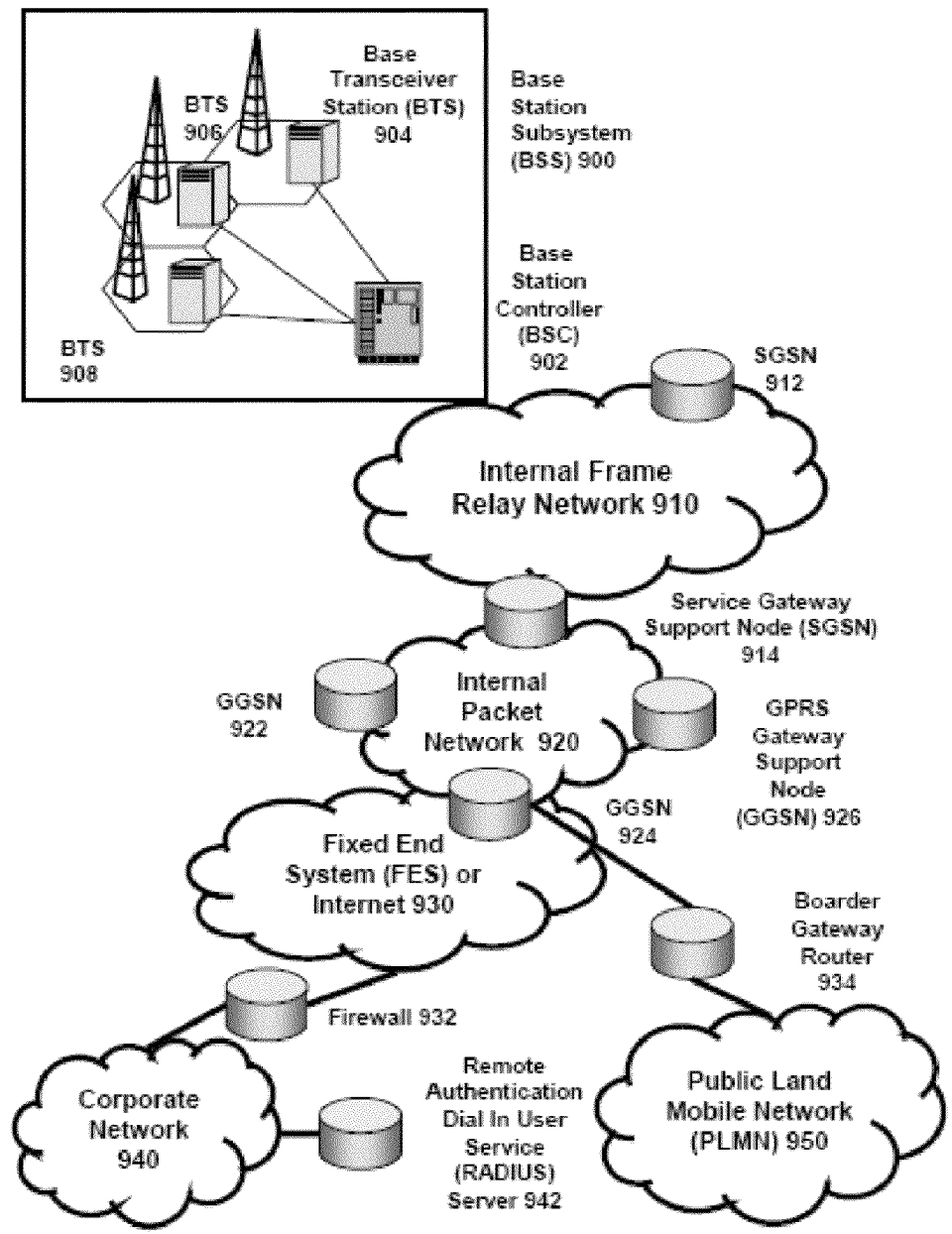
FIG. 10 is an overall block diagram of an exemplary packet-based mobile cellular network environment, such as a GPRS network, in which the present subject matter may be implemented.

FIG. 9 is a block diagram of an example processor 1158 which may be employed in any of the embodiments described herein, including as one or more components of a communications device such as device 102 which may be a wireless communications device, as one or more components of communications network equipment or related equipment, such as any component of network 103, and/or as one or more components of any third party system or subsystems that may implement any portion of the subject matter described herein. It is emphasized that the block diagram depicted in FIG. 9 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 9) to allow communications between these portions. The input/output portion 1164 is capable of providing and/or receiving components utilized to, for example, transmit/receive messages and/or transmit/receive data for an address book or contact list.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing messages, contact information and numbers, determining alternate contacts, etc. For example, as described above, the memory portion is capable of storing an address book and software capable of operating the address book and determining alternate numbers. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network 103. Communications connection(s) 1180 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Network 103 may comprise any appropriate telephony radio network, or any other type of communications network, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how IP cellular broadcast may be used with stationary and non-stationary network structures and architectures. It can be appreciated, however, that systems for providing user names for network addresses such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the techniques of the utilization of SMS, MMS, and/or cellular broadcast can be applied independently of the method of data transport, and do not depend on any particular network architecture, or underlying protocols.

Figure 11:
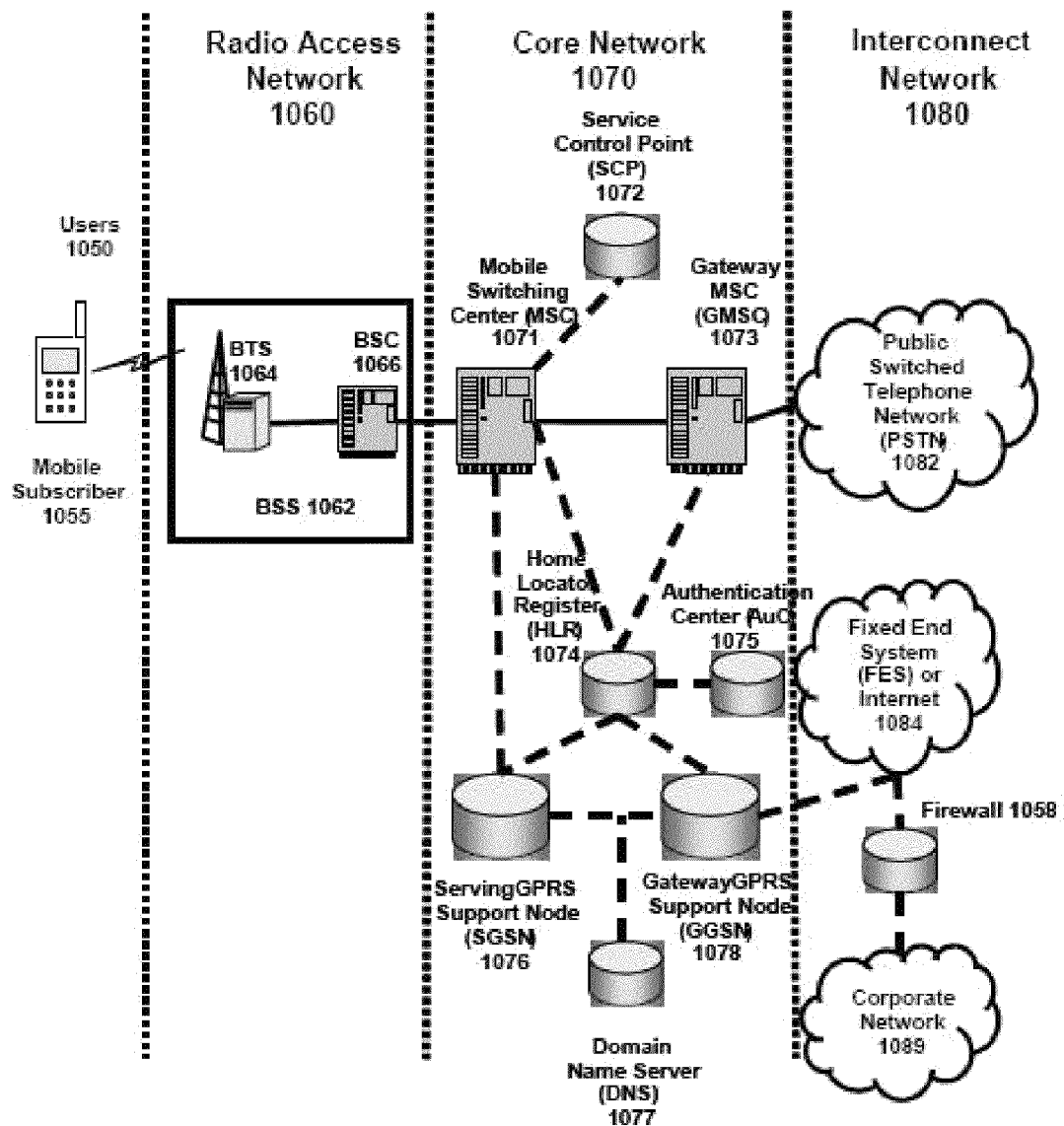
FIG. 11 illustrates a non-limiting, exemplary architecture of a typical GPRS network as segmented into four groups.

FIG. 11 depicts an overall block diagram of an exemplary packet-based mobile cellular network environment, such as a GPRS network, in which systems providing user names for network addresses such as those described herein can be practiced. In an example configuration, network 103 may be encompassed by the network environment depicted in FIG. 11. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., device 102) become connected to the wireless network. In exemplary fashion, the packet traffic originating from user devices (e.g., device 102 and device 104) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932; and PLMN 950 may be connected to GGSN 924 via boarder gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

FIG. 11 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 11). In an example embodiment, the device depicted as mobile subscriber 1055 may comprise device 102 and/or device 104. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 11, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as device 102, used by an end user of the mobile cellular service. When a mobile subscriber turns on his or her mobile device, the mobile device may go through an attach process by which the mobile device attaches to an SGSN of the GPRS network. In FIG. 11, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of message systems and methods for providing user names for network addresses such as those described herein can include but are not limited to Gateway GPRS Support Node tables, Fixed End System router tables, firewall systems, VPN tunnels, and any number of other network elements as required by the particular digital network.

Figure 12:
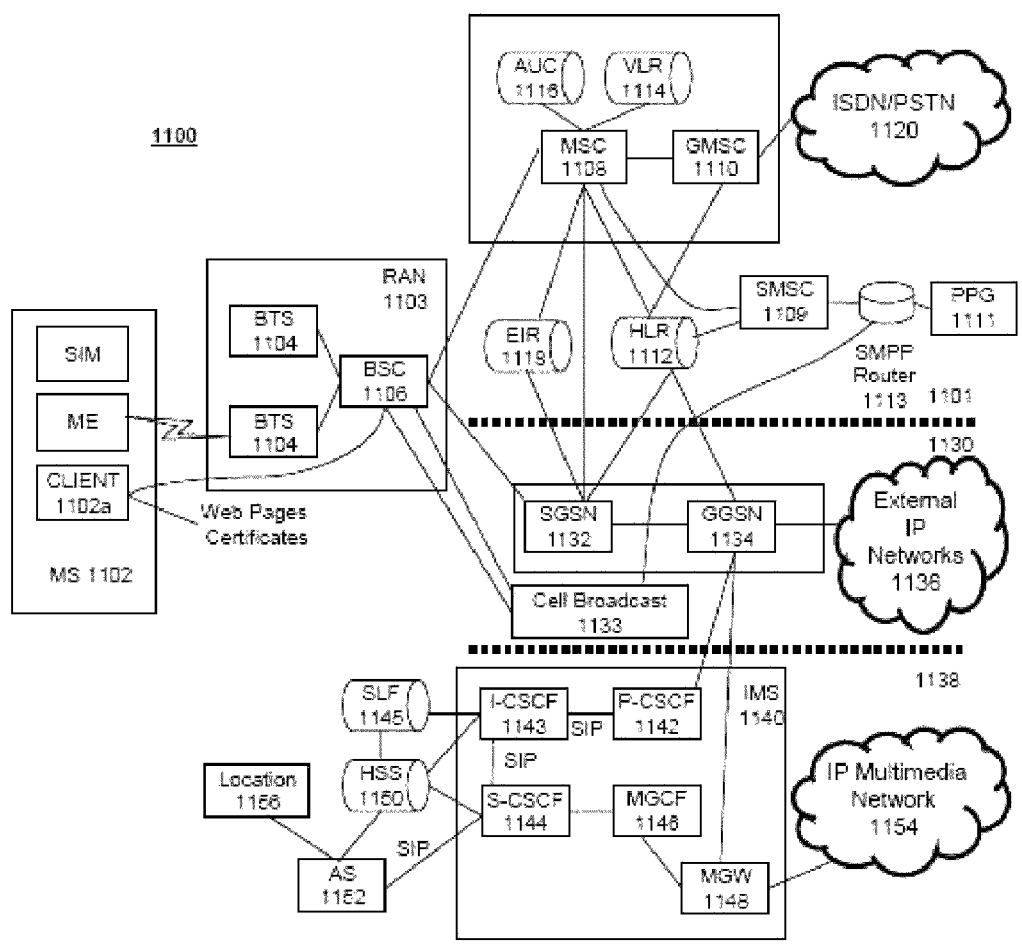
FIG. 12 illustrates a non-limiting alternate block diagram of an exemplary GSM/GPRS/IP multimedia network architecture in which the present subject matter may be implemented.

FIG. 12 illustrates another exemplary block diagram view of a GSM/GPRS/IP multimedia network architecture 1100 in which systems providing user names for network addresses such as those described herein can be incorporated. As illustrated, architecture 1100 of FIG. 12 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., device 102) that is used by mobile subscribers, with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include address book data and/or message forwarding preferences for each subscriber. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain address book data and/or message forwarding preferences for each subscriber. The HLR 1112 and the VLR 1114, together with the MSC 1108, may provide the call routing and roaming capabilities of GSM, as well as message forwarding functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

While example embodiments systems and methods providing user names for network addresses such as those described herein have been described in connection with various computing devices/processors, the underlying concepts can be applied to any computing device, processor, or system capable of implementing the systems and methods for providing user names for network addresses described. The various techniques described herein can be implemented in connection with hardware or software or, where appropriate, with a combination of both. Thus, the methods and apparatuses for the systems and methods for providing user names for network addresses, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a system for providing user names for network addresses. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for providing user names for network addresses as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus a message forwarding system. When implemented on a general-purpose processor, the program code combines with the processor to provide a unique apparatus that operates to invoke the functionality of a message forwarding system. Additionally, any storage techniques used in connection with a message forwarding system can invariably be a combination of hardware and software.

While the systems and methods for providing user names for network addresses have been described in connection with the various embodiments of the various figures, it is to be understood that other similar embodiments can be used or modifications and additions can be made to the described embodiments for performing the same function message forwarding without deviating from the described systems and methods. For example, one skilled in the art will recognize that a system providing user names for network addresses as described in the present application may apply to any environment, whether wired or wireless, and may be applied to any number of such devices connected via a communications network and interacting across the network. Therefore, systems providing user names for network addresses such as those described herein should not be limited to any single embodiment, but rather should be construed in breadth and scope in accordance with the appended claims. These and other changes can be made to the invention in light of the above detailed description. In general, in the following claims, the terms used should not be construed to limit the invention to the specific embodiments disclosed in the specification and the claims, but should be construed to include all networked digital messaging systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A method of voting in a telephone conference using a mobile device comprising:
   connecting the mobile device to a wireless communication network;
   entering a telephone conference address into the mobile device;
   entering a conference identifier;
   connecting to a conference bridge;
   sending a user identification signal from the mobile device;
   receiving a digital vote request signal in the mobile device;
   displaying the digital vote request on the mobile device;
   recording a vote on the mobile device; and
   sending a digital vote signal of the recorded vote, the vote signal including the user identification signal, from the mobile device to the conference bridge.

2. The method of claim 1 wherein the digital vote request signal is transmitted as one selected from among the group of digital signals comprising an SMS message, a digital signal transmitted through the cellular network data channel, an IMS signal or a web based signal.

3. The method of claim 1 wherein the user identification signal comprises a signal that identifies the mobile device.

4. The method of claim 1 further comprising receiving the vote results in the mobile device.

5. The method of claim 1 further comprising displaying the vote results on a display in the mobile device.

6. A system for enabling a user to vote in a telephone conference established through a conference bridge comprising:
   a mobile device connected to a telephone network;
   a user interface module in the telecommunication device, the user interface enabling the user to provide a teleconference address and a user identification;
   a subsystem in the mobile device that receives a digital vote request signal from the conference bridge;
   the user interface including a subsystem that displays the vote request signal;
   the user interface including a subsystem that provides the user with a vote option;
   a subsystem that records the user's vote; and
   a subsystem that sends a digital vote signal of the user's vote and the user identification to the conference bridge.

7. The system of claim 6 wherein the digital vote request signal is transmitted as one selected from among the group of digital signals comprising an SMS message, a digital signal transmitted through the cellular network data channel, an IMS signal or a web based signal.

8. The system of claim 6 wherein the digital vote signal comprises a signal that identifies the mobile device.

9. The system of claim 6 further comprising at least one subsystem that receives the vote results in the mobile device.

10. The system of claim 6 further comprising a user interface that displays the vote results on a display in the mobile device.

11. An apparatus for voting in a teleconference established through a conference bridge comprising:
- a mobile device; and
- tangible computer readable media that provides instructions to
- connect the mobile device to a wireless communication network;
- provide a teleconference address;
- enter a conference identifier;
- receive a digital vote request signal from the conference bridge in the mobile device; and
- send a digital vote signal including a user identification signal from the mobile device to the conference bridge.

12. The apparatus of claim 11 wherein the vote request signal is transmitted as one selected from among the group of digital signals comprising an SMS message, a digital signal transmitted through the cellular network data channel, an IMS signal or a web based signal.

13. The apparatus of claim 11 wherein the user identification signal comprises a signal that identifies the mobile device.

14. The apparatus of claim 11 further comprising computer readable media that provides instructions to receive the vote results in the mobile device.

15. The apparatus of claim 11 further comprising computer readable media that provides instructions to display the vote results on a display in the mobile device.

16. A method of taking a vote from a plurality of remote participants during a teleconference comprising:
- establishing a conference call between a set of telecommunication devices through a conference bridge wherein the remote participants are using a telecommunication device and wherein a subset of the remote participants are each using a mobile device;
- sending a digital vote request signal through the conference bridge to the telecommunication devices;
- receiving a digital vote signal and a user identification from each telecommunication device through the conference bridge; and
- compiling a vote tally.

17. The method of claim 16 further comprising determining whether the remote participants are entitled to vote.

18. The method of claim 16 wherein the vote request signal is transmitted as one selected from among the group of digital signals comprising an SMS message, a digital signal transmitted through the cellular network data channel, an IMS signal or a web based signal.

19. The method of claim 16 further comprising designating one of the telecommunication devices a voting control device.

20. The method of claim 16 wherein the digital vote signal includes an identification of the telecommunication device and an indication of the vote.

21. The method of claim 19 further comprising muting all voice signals except for the voting control device during a specified time interval.

22. A system for taking a vote from a plurality of participants to a teleconference established through a conference bridge, the plurality of participants including at least one remote participant, and where each of the participants has a telecommunication device, the system comprising:
- a digital processing device;
- a subsystem that establishes a conference call between all participants in the teleconference;
- a subsystem that sends a vote request signal from the conference bridge to the telecommunication devices;
- a subsystem that receives a vote signal and a user identification from each telecommunication device through the conference bridge; and
- a subsystem that compiles a vote tally.

23. The system of claim 22 further comprising at least one subsystem that determines whether the remote participants are entitled to vote.

24. The system of claim 22 wherein the vote request signal is transmitted as one selected from among the group of digital signals comprising an SMS message, a digital signal transmitted through the cellular network data channel, an IMS signal or a web based signal.

25. The system of claim 22 further comprising at least one subsystem that designates one of the telecommunication devices as a voting control device.

26. The system of claim 22 wherein the user identification includes an identification of the telecommunication device.

27. The system of claim 25 further comprising at least one subsystem that mutes all voice signals except for the voting control device during a specified time interval.

* * * * *